June 7, 1932. J. O. SMALL 1,862,040
APPARATUS FOR HANDLING STRIP MATERIAL
Filed Oct. 26, 1928
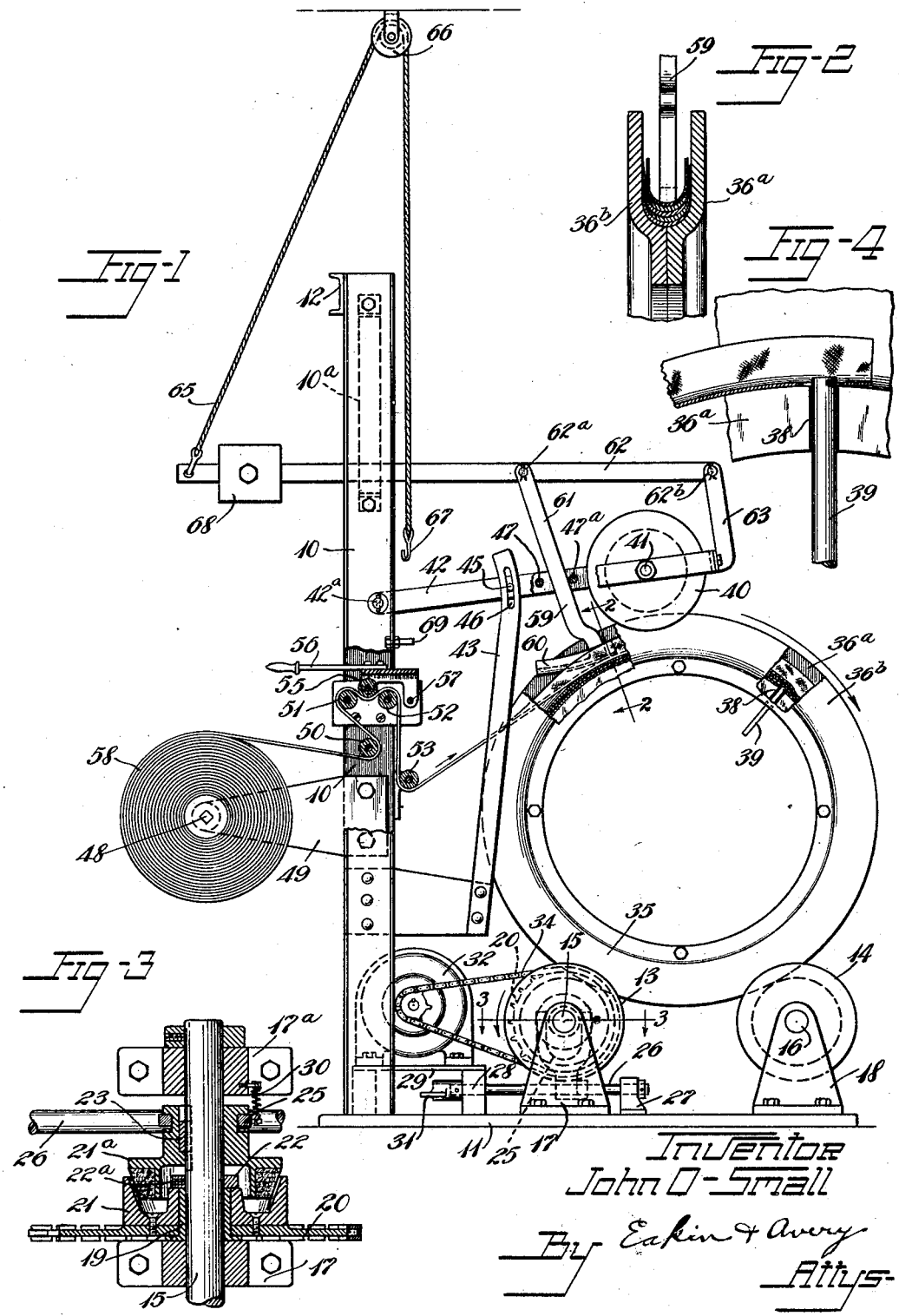

Patented June 7, 1932

1,862,040

UNITED STATES PATENT OFFICE

JOHN O. SMALL, OF AKRON, OHIO, ASSIGNOR TO THE B. F. GOODRICH COMPANY, OF NEW YORK, N. Y., A CORPORATION OF NEW YORK

APPARATUS FOR HANDLING STRIP MATERIAL

Application filed October 26, 1928. Serial No. 315,221.

This invention relates to methods and apparatus for handling strip material and more especially to methods and apparatus for shaping strip material and winding it onto a drum or the like.

Among the chief objects of my invention are to provide an improved method and improved apparatus for evenly shaping a strip of material transversely thereof, as in making tire flaps of trough-like cross-sectional form, so that the strip will lie smoothly in place in successive convolutions and will retain its shape when it is wound on a drum; and to provide for concurrently shaping and winding a transversely-shaped strip of material in a series of superposed and interfitting convolutions on a winding form in such manner that the strip will not be subjected to deforming forces after it is shaped and before it is vulcanized.

The invention is of especial utility in connection with the fabrication of tire flaps and the like in which a strip of vulcanizable material is wound under tension in a series of superposed convolutions within an annular groove formed on the outer periphery of a drum while being shaped thereon, and the drum with the material thereon is then placed in a vulcanizer and the material vulcanized.

Of the accompanying drawing:

Fig. 1 is a side elevation of my apparatus, parts thereof being broken away, and other parts being shown in section.

Fig. 2 is a section on the line 2—2 of Fig. 1.

Fig. 3 is a horizontal section on line 3—3 of Fig. 1.

Fig. 4 is a vertical middle section of a fragmentary part of a drum and work associated therewith.

Referring to the drawing, the apparatus comprises a pair of vertically-arranged parallel frame members 10, 10, secured to the base member 11 adjacent an end thereof with their respective upper ends braced against independent lateral movement by the channel member 12.

Each of the frame members 10, 10, has secured thereto near its upper inner end a U-shaped, metal strap or guide member $10^a$, each of the latter having its ends secured to a frame member 10, and having its intermediate offset portion inwardly offset from the frame member and so arranged that the two of them extend toward each other and define between them an elongated slot or guideway open both at the top and bottom.

A pair of channeled or grooved cradle rolls 13, 14, the roll 13 being a driving roll and the roll 14 being an idler, are mounted on respective shafts 15, 16 which are mounted in journal brackets mounted on the base member 11. Three brackets, 17, 17 and $17^a$ are provided for the shaft 15 of the driving roll and the shaft 16 is mounted in only two brackets, such as the bracket 18, Fig. 1.

The cradle rolls 13, 14 have facings of rubber or like frictional and cushioning material on their grooved work-carrying surfaces and are of approximately the same diameter. A centrally-apertured sprocket 20 is mounted on a flanged bushing 19 mounted for free rotation on the shaft 15 between the journal brackets 17 and $17^a$. The female member 21 of a cone clutch is secured to the sprocket member by screws or the like. A retaining collar 22 is secured on the shaft 15 by a set screw $22^a$ to hold the sprocket and clutch member rotatably in position upon the shaft.

A male clutch member $21^a$ is splined to the shaft 15 by a key 23 for coaction with the female clutch member 21. The male clutch member $21^a$ is provided with a shipper arm 25 which is secured upon a horizontal rock shaft 26, the latter being mounted at its respective ends in a journal bracket 27 and in a bearing 28 formed on a motor-supporting structure 29. A tension spring 30 connects the shipper arm with the journal bracket $17^a$ to urge the clutch member $21^a$ toward de-clutched position, and a treadle 31 is secured to the rock shaft 26 for engaging the clutch. A motor 32 mounted on the motor support 29 is connected by a sprocket chain 34 to the sprocket 20 on the shaft 15 so as to drive the sprocket 20 and shaft 15 in the direction of the arrow in Fig. 1. The cradle rolls 13, 14 support an annular metal drum or spool 35 preferably formed of two complemental annular members $36^a$, $36^b$ bolted together and defining between them an outwardly-open U-shaped channel. An aperture 38 extends radially through the drum at the juncture of the two annular members. A notched pin 39 is adapted to be inserted into the aperture 38 in the drum for detachably securing upon the drum an end of a strip of fabric to be wrapped thereon.

In order to prevent undesirable jarring and uncontrolled side movement of the heavy drum 35 during rotation thereof upon the cradle rolls 13, 14 a grooved idler roll 40 adapted to straddle the drum is mounted on a shaft 41 which is mounted in a U-shaped or yoke member 42 having its arms pivotally secured at 42ª to the respective frame members 10, 10. The U-shaped member 42 is adapted to be supported, when the cradle rolls have no drum thereon, by a pair of brace members such as the members 43, each side of the yoke being provided with a stud, such as the stud 45, extending into a curved slot, such as the slot 46, formed in the adjacent brace member.

For supporting a stock roll of strip material 58 a horizontal spindle 48 is mounted on a bracket 49 projecting from one of the frame members.

A series of guide rolls 50, 51, 52, 53 are mounted on fixed shafts between the frame members 10, 10, and for cooperating with the intermediate rolls 51, 52 of the series to tension a strip of tire-flap material threaded through the series of rolls a presser roll 55 is journaled on a hand lever 56 which is pivoted at 57 on the frame, the roll 55 being adapted to be crowded in between the rolls 51, 52 to grip the strip and increase their friction against their shafts.

The mechanism for shaping the strip material comprises a shoe 59 having an arcuate strip-shaping portion 60 adapted to press the strip into the groove of the drum substantially at the strip's point of tangency to the drum, the shoe being so shaped as accurately to give the desired cross-sectional form to the strip. The shoe 59 is secured near its heel upon the lower end of a force-applying arm 61 which has its upper end hinged at 62ª to an intermediate portion of an approximately horizontal weighted lever 62 which is pivoted at 62ᵇ to an upright support 63 rising from the outer end of the yoke 42. A pair of parallel guide members 47, 47ª, extend between the arms of the yoke 42 to limit the swinging movement of the shoe about the pivot pin 62ª. The weighted lever 62 extends between the guides 10ª, 10ª and its outer end portion, having a weight 68 mounted for adjustment thereon, has secured thereto a flexible cable 65 which extends over an overhead pulley 66 and is provided on the other side thereof with a hook 67 at a point within ready reach of the operator, the hook being adapted to be engaged with a stud 69 mounted on one of the frame members to hold the shoe 59 in raised position.

In the operation of the apparatus the strip of material in flat cross-sectional form is drawn from a stock roll on the spindle 48, past the guiding and tensioning devices described, and is wound onto the drum, which is then easily removed from the rest of the apparatus and conveyed to the vulcanizer. As the heel of the shoe engages the fabric at substantially the same moment the latter contacts with the drum and with the preceding turn of the strip hereon, the strip is fully shaped while it is under slight tension and before it has had an opportunity to adhere strongly to the drum or to the underlying turn. The strip is shaped transversely and longitudinally at the same time and then vulcanized without further change of form, which avoids the undesirable tensioning of the margins and deforming of the shaped strip which occurs when such a strip is transversely shaped at a distance from its point of tangency or initial contact with relation to a channeled vulcanizing drum on which it is wound and is thereafter given the longitudinal curvature in being wound onto the drum.

The apparatus also has the advantage that drums of different sizes, to make flaps for tires of different sizes, readily may be substituted for each other.

My invention is susceptible of modification within the scope of the appended claims.

I claim:

1. Strip-shaping and winding apparatus comprising a circular member having a laterally-curved outer peripheral surface, cushion surfaced cradle means for rotating the said member, and laterally-curved yielding means adapted to automatically press in a substantially radial direction against the said laterally-curved outer peripheral surface of the circular member, said circular member being provided with means for securing the leading end of the strip.

2. Strip-shaping and winding apparatus comprising a rotatable support having a laterally-concaved peripheral surface, cushion surfaced cradle means for rotating the support to wind a strip of material onto the same, and an arcuate, laterally-curved shoe movable radially with respect to the said support and cooperating with the support for shaping the flat material to approximately the shape of the curved peripheral surface of the support and for automatically pressing the thus shaped material onto the laterally-concaved outer surface of the support, said support being provided with means for securing the leading end of the strip.

3. Strip-shaping and winding apparatus comprising a rotatable support having a laterally-concaved outer peripheral surface, cushion surfaced cradle means for rotating the support whereby to wind initially-flat strip material thereon, and means having a laterally-curved surface associated with the support for automatically shaping the flat strip material to channel form and yielding means for pressing the shaping means onto the said outer peripheral surface of the support, said support being provided with means for securing the leading end of the strip.

4. Strip-shaping and winding apparatus comprising a rotatable support having an annular channel on its outer peripheral surface, cushion surfaced cradle means for rotating the support for winding strip material thereon, a strip-shaping member having a laterally-curved portion thereof adapted to be brought in pressing engagement with the channel of the support, and means for applying a determinate force upon the said curved member to hold it in pressing engagement with strip material carried on the said support, said support being provided with means for securing the leading end of the strip.

5. Apparatus as defined in claim 4 in which the said pressing means is adjustable for the application of different determinate pressures upon the shaped material on the support.

6. Strip-shaping and winding apparatus comprising cushion surfaced means for peripherally supporting and driving a circumferentially-channeled winding form, means for pressing a strip of material into the channel of the form as it is wound therein by rotation of the form, means for yieldingly urging the said pressing means toward winding forms of different diameters mounted upon the said driving means with approximately the same determinate force, and means for securing the leading end of the strip to the winding form.

7. Apparatus as defined in claim 6 in which the pressing means comprises a shoe adapted to slide upon the work and in which the means for yieldingly urging it as defined comprises a lever and means connecting the shoe with a part of the lever remote from its fulcrum.

8. Apparatus as defined in claim 6 in which the pressing means comprises a shoe adapted to slide upon the work and in which the means for yieldingly urging it as defined comprises a lever and means for shifting the fulcrum of the lever in accordance with the different diameters of successive forms.

In witness whereof I have hereunto set my hand this 10th day of October, 1928.

JOHN O. SMALL.